United States Patent
Diehl

(10) Patent No.: US 10,977,228 B2
(45) Date of Patent: Apr. 13, 2021

(54) DATA TREND ANALYSIS

(71) Applicant: ORACLE INTERNATIONAL CORPORATION, Redwood Shores, CA (US)

(72) Inventor: Brian Kelly Diehl, Mooresville, NC (US)

(73) Assignee: Oracle International Corporation, Redwood Shores, CA (US)

(*) Notice: Subject to any disclaimer, the term of this patent is extended or adjusted under 35 U.S.C. 154(b) by 204 days.

(21) Appl. No.: 16/206,227

(22) Filed: Nov. 30, 2018

(65) Prior Publication Data

US 2019/0095850 A1   Mar. 28, 2019

Related U.S. Application Data

(63) Continuation of application No. 14/714,598, filed on May 18, 2015, now Pat. No. 10,223,391.

(Continued)

(51) Int. Cl.
*G06F 16/21* (2019.01)
*G06F 16/27* (2019.01)
(Continued)

(52) U.S. Cl.
CPC ........ *G06F 16/219* (2019.01); *G06F 16/2282* (2019.01); *G06F 16/2358* (2019.01);
(Continued)

(58) Field of Classification Search
None
See application file for complete search history.

(56) References Cited

U.S. PATENT DOCUMENTS

| | | | | |
|---|---|---|---|---|
| 6,978,281 B1 | * | 12/2005 | Kruy | G06F 8/71 |
| 7,113,915 B1 | * | 9/2006 | Montemayor | G06Q 10/06311 |
| | | | | 705/7.13 |

(Continued)

OTHER PUBLICATIONS

"How to Use the New Baselines View—LiquidPlanner", downloaded Feb. 2, 2015 from: http://www.liquidplanner.com/blog/how-to-use-the-new-baseline-view-for-snapshots-and-comparative-data/; pp. 1-18.

(Continued)

*Primary Examiner* — Christopher J Raab
(74) *Attorney, Agent, or Firm* — Kraguljac Law Group, LLC

(57) ABSTRACT

Systems, methods, and other embodiments associated with history and scenario data tracking are described. In one embodiment, a method includes receiving a request for trending analysis on project data. The request includes a trend range and a time basis. The method also includes selecting a set of records that fall within the trend range from an item table associated with the time basis, and generating a snapshot of the project data for each effective time in each selected record in the item table. The generating includes executing a trend view on (i) a history table storing a version history for every record modified, (ii) a transaction table storing a transaction history for every record modified, and (iii) a base table storing base records corresponding to a current version of the records to create the snapshot. The snapshots of project data are returned in response to the request for trending analysis.

20 Claims, 8 Drawing Sheets

Related U.S. Application Data

(60) Provisional application No. 62/136,792, filed on Mar. 23, 2015.

(51) Int. Cl.
*G06F 16/22* (2019.01)
*G06F 16/23* (2019.01)
*G06F 16/2458* (2019.01)
*G06F 16/2457* (2019.01)
*G06Q 10/06* (2012.01)

(52) U.S. Cl.
CPC .... *G06F 16/2474* (2019.01); *G06F 16/24575* (2019.01); *G06F 16/27* (2019.01); *G06Q 10/063114* (2013.01)

(56) References Cited

U.S. PATENT DOCUMENTS

| | | | |
|---|---|---|---|
| 7,334,094 B2 | 2/2008 | Fair | |
| 7,395,258 B2 | 7/2008 | Altinel | |
| 7,908,167 B1* | 3/2011 | Crum | G06Q 10/06 705/7.38 |
| 7,925,527 B1* | 4/2011 | Flam | G06Q 10/063112 705/7.26 |
| 8,005,705 B2 | 8/2011 | Gura et al. | |
| 8,489,440 B2 | 7/2013 | Salwitz et al. | |
| 2003/0229524 A1* | 12/2003 | Reuveni | G06F 11/3409 705/7.11 |
| 2007/0130226 A1 | 6/2007 | Banerjee | |
| 2007/0271185 A1* | 11/2007 | Engler | G06Q 20/206 705/51 |
| 2008/0183973 A1 | 7/2008 | Aguilera | |
| 2010/0153158 A1 | 6/2010 | Wex et al. | |
| 2012/0253876 A1 | 10/2012 | Hersch | |
| 2013/0086521 A1* | 4/2013 | Grossele | G05B 15/02 715/810 |
| 2013/0290219 A1* | 10/2013 | DuBois | G06Q 40/06 705/36 R |
| 2013/0332487 A1 | 12/2013 | Ramesh | |
| 2013/0332660 A1 | 12/2013 | Talagala | |
| 2014/0122430 A1* | 5/2014 | Dary | G06Q 10/0639 707/624 |
| 2014/0283048 A1* | 9/2014 | Howes | G06F 21/55 726/23 |
| 2015/0009804 A1 | 1/2015 | Koponen | |
| 2015/0143064 A1 | 5/2015 | Bhargava | |
| 2015/0261870 A1 | 9/2015 | Hrle | |
| 2016/0077920 A1 | 3/2016 | Regni | |
| 2016/0085777 A1 | 3/2016 | Engelko | |
| 2017/0052879 A1 | 2/2017 | Chandra | |

OTHER PUBLICATIONS

"Package Baselines", downloaded Feb. 2, 2015 from: http://www.sparxsystems.com/enterprise_architect_user_guide/9.3/projects_and_teams/baselinesanddifferences.html; pp. 1-3.

"Baseline UML Models", downloaded Feb. 2, 2015 from: http://www.sparxsystems.com/downloads/resources/booklets/baseline_uml_models.pdf; pp. 1-15.

"Earned Value Management", downloaded Feb. 2, 2015 from: http://www.evmax.net/en-us/Earned-Value-Management-Software/Earned-Value/evms/EVM.aspx; pp. 1-3.

"Project Management", downloaded Feb. 2, 2015 from: http://www.klusa.com/index.php/en/Project-Management/projectmanagement.html; pp. 1-2.

"Baselines in CA Clarity PPM and Microsoft Project", downloaded Feb. 2, 2015 from: http://cookbooks.ca.com/cacppm/2014/08/12/baselines-in-ca-clarity-ppm-and-microsoft-projecti; pp. 1-2.

"SAFRAN Project", downloaded Feb. 2, 2015 from: http://www.leadformix.com/bf/uploads/nlp/lpfiles/lpimg2910/Safran_Project_Brochure_Web.pdf; pp. 1-6.

"Project Time Management", downloaded Jan. 31, 2015 from: http://www.free-management-ebooks.com/faqpm/time-08.htm; pp. 1-6.

"Create or Update a Baseline or an Interim PLan", downloaded Jan. 31, 2015 from: https://support.office.microsoft.com/en-in/article/Create-or-update-a-baseline-or-an-interim-plan-74b5aac6-d3f2-4346-8632-7a226c6de186?CorrelationId=3f5c5814-86ed-4e8f-b8f6-62c1367df5fe&ui=en-US&rs=en-IN&ad=IN; pp. 1-6.

"How do I Baseline a Project or Snapshot a Sales Pipeline", downloaded Feb. 2, 2015 from: http://quickbase.intuit.com/developer/knowledge-base/how-do-i-baseline-project-or-snapshot-sales-pipeline; pp. 1-5.

"Baseline Change Control Procedure", EVMS-P-7, downloaded from: http://www.fnal.gov/directorate/OPMO/Shared/Other%20Lab%20Docs/PNNL/Old/EVMS_P-7_Baseline_Change_Control_Rev_0.pdf; pp. 1-24; Revision 0—Oct. 2006, Pacific Northwest National Laboratory.

Schumacher, et al., "Creating Half-Step Schedules Using P6 Baseline Update", Jun. 30, 2013, downloaded from: http://www.ronwinterconsulting.com/Creating_Half-Step_Schedules_Using_P6.pdf; pp. 1-14.

"ProjStream Project Solutions", 2014, downloaded from: http://www.evmax.net/App_Themes/www_evmax_net/customimages/2014_EVMax-Data-Sheetpdf; pp. 1-2.

Office Action dated Nov. 28, 2017 for co-pending U.S. Appl. No. 14/710,771, filed May 13, 2015.

* cited by examiner

US 10,977,228 B2

DATA TREND ANALYSIS

CROSS REFERENCE TO RELATED APPLICATIONS

This disclosure is a Continuation of U.S. application Ser. No. "14/714,598" filed May 18, 2015, titled "Data Trend Analysis", inventor: Brian Diehl, which claims the benefit of U.S. Provisional Patent Application Ser. No. "62/136,792" filed Mar. 23, 2015, titled "History, Trending and Scenario Data Tracking", inventor: Brian Diehl, and assigned to the present assignee, Each of the foregoing applications is incorporated herein in its entirety by reference.

BACKGROUND

Measuring progress against a baseline is a fundamental aspect of Project Portfolio Management. The baseline corresponds to the project's status at some established point in the past and in some instances the baseline itself is adjusted during the course of the project. Thus, measuring a project's progress against a baseline is a continuous and dynamic process that is often as important as maintaining the baseline itself.

BRIEF DESCRIPTION OF THE DRAWINGS AND EXHIBITS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
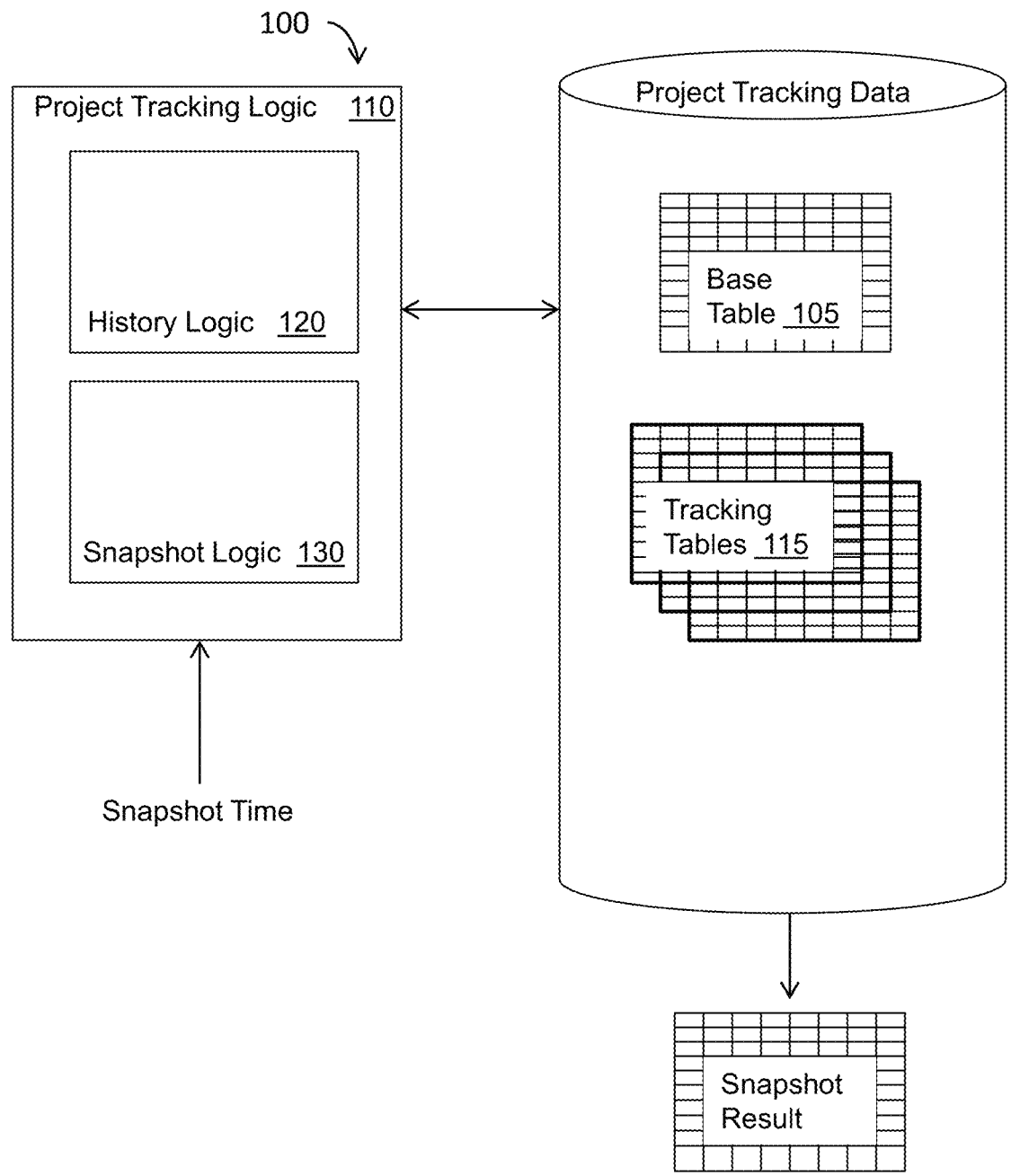
FIG. 1 illustrates one embodiment of a system associated with historical data tracking.

Traditional approaches to tracking project progress capture and store "snapshots" of the entire project. The snapshots are complete copies of all project data including data that is usually hidden from the everyday user of the project portfolio management solution. Each snapshot consumes a large amount of memory, so change management is often accomplished by updating the snapshots when changes occur rather than storing a new snapshot, which results in the loss of original snapshot data. Having a finite set of snapshots limits the granularity with which analysis can be performed.

Systems and methods are described herein that provide project progress management without relying on stored snapshots. These systems and methods improve over the prior art at least by reducing the memory required to support a trending analysis of project progress. Rather than storing snapshots, the systems and methods herein maintain a few project tracking tables and provide a mechanism for capturing project status at prescribed intervals to perform trending analysis. The systems and methods herein provide the trending feature by accessing the base table and the tracking tables as well as an item table that includes a record for each increment in a given time basis. By at least generating snapshots of project data from (i) a history table of all versions of each record in the project data that has been modified, (ii) a transaction table of transaction records for each record in the project data that has been modified, and (iii) a base table storing current versions of the records in the project data, the improvement of the ability to provide trend analysis at any granularity on-the-fly is enabled. Thus, copies of project data do not need to be stored, and memory requirements are reduced.

In some embodiments, a method, a computer system, or a non-transitory computer-readable storage medium are provided that implement the following: receiving a request for trending analysis on project data, where the request includes a trend range and a time basis; in response to determining that an item table is associated with the time basis of the request, selecting the item table from amongst a plurality of item tables that are each associated with a corresponding time basis, where the item table includes a record for each time increment of the time basis, where each respective record includes an effective time for the respective time increment; selecting a set of records in the item table that fall within the trend range; generating a snapshot of the project data for each effective time in each respective selected record in the item table, wherein the generating includes: maintaining a history table that stores a version history for each record in the project data that has ever been modified, maintaining a transaction table that stores a transaction record for each record in the project data that has ever been modified, and executing a trend view on the history table, the transaction table, and a base table that stores base records corresponding to a current version of the records in the project data to create a snapshot for each effective time in the selected item table records; and in response to the request for trending analysis, returning the generated snapshots of project data.

Snapshots

FIG. 1 illustrates one embodiment of project tracking system 100 that includes project tracking logic 110 configured to populate and access project tracking data to perform various analyses related to project tracking. Base project data may include, for example, records corresponding to various tasks that must be completed to complete a project. Each record may store a task status, projected start and end time, task cost, and so on for the task. As the project progresses, tasks are completed, start and end times are revised, and costs are updated. These changes are reflected by editing the base project data. The project tracking data includes at least one base table 105 that stores the current version of project data. For the purposes of this description tables are data structures configured to store records in corresponding rows.

In a more general sense, project data encompasses any set of data related to the same functional area. For example an employee base table may be maintained by human resources or payroll. Some of the examples that follow are in the context of an employee base table, but the principles of operation demonstrated in the examples are agnostic with respect to the type of data stored in the base table.

The project tracking logic 110 includes history logic 120 and snapshot logic 130. The history logic maintains one or more tracking 115 tables stored with the project tracking data. Snapshot logic 130 interacts with the tracking tables 115 along with the project's base table 105 to provide, on demand, a snapshot result that includes the values stored in the base table as of a given snapshot date.

Figure 2:
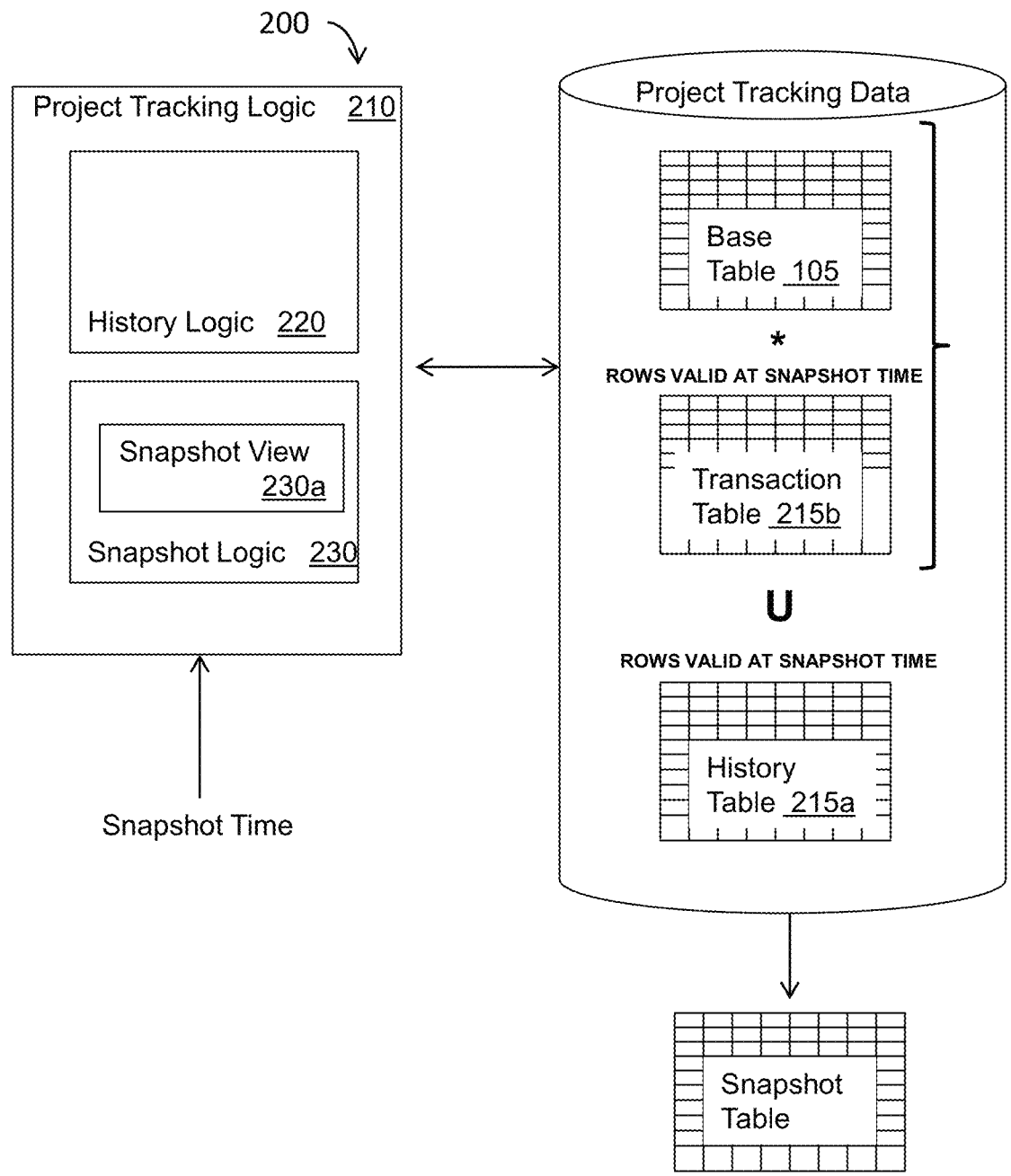
FIG. 2 illustrates one embodiment of a system associated with historical data tracking.

FIG. 2 illustrates on embodiment of a project tracking logic 210 that includes history logic 220 and snapshot logic 230. The history logic 220 maintains a history table 215a and a transaction table 215b that are examples of the tracking tables 115 of FIG. 1. The history table 215a has the same column structure as the base table 105 and is initially empty. For the purposes of this description each row in the base table 105 stores a "base record" that has a unique primary key (e.g. a unique identifier such as a row id in some databases). The terms "row in the base table 105" and "base record" are used interchangeably and are intended to have the same meaning.

As the base table 105 is updated, the history table 215a stores rows containing historical records. Each historical record corresponds to a prior version of a row in the base table 105 that is modified. In other words, when a row in the base table 105 is modified (e.g., updated or deleted), prior to the modification being made in the base table 105, the history logic 220 stores the base record in its present condition as a historical record in the history table 215a. If the base record is modified a second time, a second historical record will be stored in the history table 215a corresponding to the base record's condition prior to the second modification. The primary key for the base record links the base record to historical records corresponding to prior versions of the base record, if any, in the history table 215a. The terms "row in the history table" and "historical record" are used interchangeably and are intended to have the same meaning. Any base record in the base table 105 that has not been modified will not have any corresponding historical records in the history table 215a.

When a row is first added to the base table 105, no row is created in the history table 215a, however, the base table 105 stores a CREATE_TS timestamp for all rows that can be used to filter out "new" rows when a prior version of the base table 105 is being compiled as will be describe in more detail below. The history table 215a includes columns for a BEGIN_TS and an END_TS. The BEGIN_TS is the timestamp at which the row was first valid. The END_TS is the timestamp at which the row was last valid. Thus, the period between BEGIN_TS and END_TS defines a valid period time for the row during which this version of the row was actually present in the base table.

Because it can include a number of rows for each row that ever exists in the base table 105, over the course of a project the history table 215a can grow quite large. Thus it may be beneficial to partition the history table 215a. A partitioning scheme using time efficiently captures the expansion of the history table. Time is the axis of growth for the history table so it is appropriate that the history table be physically divided in a time-wise fashion.

In one embodiment, the history table is range partitioned on the END_TS column such that each partition includes rows with an END_TS less than a certain value. With range partitioning, there is generally some maximum value partition that includes rows that are not part of any other partition. For the history table, a single maximum value partition can be used at first, and as the history table grows, additional partitions can be created. Because the END_TS will always be populated with the current time when an update occurs, it is preferable, for partitioning purposes, to the BEGIN_TS which will depend on how recently the row was last updated.

The transaction table 215b includes a single transaction record for each base record in the base table 105 that has ever been modified (e.g., updated or deleted). The transaction table 215b is used by the snapshot logic 230 to determine whether a snapshot result should include, for a given primary key, the row from the base table 105 or a row from the history table 215a. The transaction table includes three columns, Row ID (which refers to a row or rows in the history table using the same primary key as the base table), BEGIN_TS, and END_TS. The terms "transaction record" and "row in the transaction table" are used interchangeably and are intended to have the same meaning.

There is at most only one row in the transaction table 215b for every row that was ever in the base table 105. Thus, when a base record is first modified, a corresponding transaction record is created in the transaction table 215b. The BEGIN_TS records the CREATE_TS timestamp for the base record from the base table 105. The END_TS records the timestamp when the base record was modified. Of course, at the same time, the unmodified version of the base record is stored in the history table 215a. When a base record is modified for a second time, the END_TS in the transaction table 215b is changed to correspond to the date of the second modification while the BEGIN_TS remains the same. Thus, it can be seen that the range between BEGIN_TS and END_TS in the transaction table 215b represents a time range when there is at least one historical record in the history table 215a for the given base record.

The following is an example of how the history logic 220 populates a history table called HT$EMP and a transaction table called HTX$EMP in response to modifications to a base table called EMP. The example begins with a new row for a new employee "Mason" being inserted into the EMP table. The record is created in the past by using the SET_CURRENT_DATE procedure to set the current time to May 14, 2013 (the date may also be implied from the current system date/time):

```
exec co_session.set_current_date(DATE '2013-05-14');
insert into emp
(empno, ename, job, mgr, hiredate, sal, comm, deptno)
values (9002,'MASON','QA',7788,DATE '2012-05-14',650,0,30)
/
commit;
```

As already discussed, no row is created in the HT$EMP or HTX$EMP table for this new insert. This is because the only version of the row is the one inserted in the base table EMP. Thus the tables HT$EMP and HTX$EMP are empty and the EMP base table includes the following base record:

| CREATE_TS | UPDATE_TS | EMPNO | ENAME | SAL | JOB |
|---|---|---|---|---|---|
| May 14, 2013 | May 14, 2013 | 9002 | MASON | 650 | QA |

Several days later on May 21, 2013 employee MASON gets a promotion and the base table EMP is updated as follows:

```
exec co_session.set_current_date(DATE '2013-05-21');
update emp set sal=670, job='QA2' where ename = 'MASON';
commit;
```

The base table EMP now includes the base record:

| CREATE_TS | UPDATE_TS | EMPNO | ENAME | SAL | JOB |
|---|---|---|---|---|---|
| May 14, 2013 | May 21, 2013 | 9002 | MASON | 670 | QA2 |

This is the first time a row storing a copy of the data for Mason is stored in the history table HT$EMP. Only saving the previous version of the row in the history table HT$EMP is necessary since the base table row has the current values for Mason. The history table HT$EMP now has the historical record:

| BEGIN_TS | END_TS | EMPNO | ENAME | SAL | JOB |
|---|---|---|---|---|---|
|  | May 21, 2013 | 9002 | MASON | 650 | QA |

The transaction table HTX$EMP now has the transaction record:

| EMPNO | HT$BEGIN_TS | HT$END_TS |
|---|---|---|
| 9002 | May 14, 2013 | May 21, 2013 |

Note that the old values for SAL (650) and JOB (QA) are stored in the new row in HT$EMP. These values were in effect until May 21, 2013. There is no need for a BEGIN_TS in the history table HT$EMP because the CREATE_TS of the row in the base table EMP indicates the earliest possible effective date for the record. The HTX$EMP table has (and always will have) only one row with a date/time range. This is the period of time for which there is a version of the row for Mason in the history table that should be used. If a snapshot result is requested for any time within that range, then a record for Mason will be pulled from HT$EMP table instead of the base table EMP.

Finally, there was a mistake in the salary (SAL) granted for the promotion. An update is made a week later on May 28, 2013 to correct this error:

```
exec co_session.set_current_date(DATE '2013-05-28');
update emp set sal=675 where ename = 'MASON';
commit;
```

The base table EMP now includes the base record:

| CREATE_TS | UPDATE_TS | EMPNO | ENAME | SAL | JOB |
|---|---|---|---|---|---|
| May 14, 2013 | May 28, 2013 | 9002 | MASON | 675 | QA2 |

Since this is a second update, a second row is added to HT$EMP (but not HTX$EMP). The history table HT$EMP now has the following two historical records:

| BEGIN_TS | END_TS | EMPNO | ENAME | SAL | JOB |
|---|---|---|---|---|---|
|  | May 21, 2013 | 9002 | MASON | 650 | QA |
| May 21, 2013 | May 28, 2013 | 9002 | MASON | 670 | QA |

The transaction table HTX$EMP now has the transaction record:

| EMP_NO | HT$BEGIN_TS | HT$END_TS |
|---|---|---|
| 9002 | May 14, 2013 | May 28, 2013 |

The additional row in HT$EMP has a BEGIN_TS value that corresponds to the END_TS of the previous historical record. The range of time in HTX$EMP has been extended to cover the newly added history record. It can be seen from the example that at any given time, one of the three rows (i.e., two in the history table and one in the base table) stored for Mason corresponds to the version of the record. The snapshot logic 230 includes a snapshot view 230a that selects which row to include in the snapshot result based on the date of the snapshot. When a snapshot table is sought for a snapshot date that falls within the range in the transaction table 215b for a given row, the snapshot table will include a row from the history table 215a instead of the row in the base table 105.

For simplicity, throughout this description the timestamp values are at a daily granularity. Of course, in many instances timestamp values have a much finer granularity, down to fractions of seconds. The level of granularity with which timestamps are handled does not affect the systems and methods described herein in any significant manner.

FIG. 2 illustrates the functionality of one embodiment of a snapshot view 230a acting on the base table 105, the history table 215a, and the transaction table 215b to produce a "snapshot table" for the given date. For the purposes of this clarity, in this description a "view" is a query that, when executed on the project tracking data returns results that are sometimes cast as a "table." A query on the project tracking data may reference the view to use the table produced by the view as the source data, rather than the base table. A table that results from a view is generated on demand and may not be stored in the long term, making it different in some ways from a traditional table.

The snapshot view 230a combines selected rows from the base table 105 and the history table 215a using a Union operation. The snapshot view 230a performs a join operation between the base table 105 and the transaction table 215b to select base records in the base table 105 that do not have a historical record in the history table that is valid on the given date. The snapshot view 230a combines the selected base records with historical records in the history table that are valid on the given date to produce the snapshot table. In this manner, a snapshot table can be produced on demand for any instant in time, at the same level of granularity as the timestamp data. Any query that could be performed on the base table 105 can be instead performed on the snapshot table.

The following example illustrates a snapshot view V_EMP_FB that acts on the base table EMP, the history table HT$EMP, and the transaction table HTX$EMP from the earlier example to produce a snapshot at a given date. A first query selects from the base table 105 using the current time:

```
select ename, sal, job
from emp
where ename = 'MASON'
```

The result is the row from the base table showing the last update to set SAL=675 and JOB=QA2.

| ENAME | SAL | JOB |
|---|---|---|
| MASON | 675 | QA2 |

Next, using co_session.set_current_date, the snapshot view is used to flashback to May 15, 2013 to see what the data looked like then:

```
exec co_session.set_current_date(DATE '2013-5-15');
select ename, sal, job
from v_emp_fb
where ename = 'MASON'
```

The result is the row from the history table that was valid on May 15, 2013 and shows Mason's starting salary.

| ENAME | SAL | JOB |
|---|---|---|
| MASON | 650 | QA |

Below is the snapshot view called V_EMP_FB referenced by the above query:

```
select h.EMPNO, h.ENAME, h.JOB, h.MGR, h.HIREDATE, h.SAL,
h.COMM, h.DEPTNO, h.UPDATE_TS,
h.UPDATE_USER,h.CREATE_TS, h.CREATE_USER
from HT$EMP h
where ( ht$END_TS >= co_session.get_current_date_as_ts
and ( ht$BEGIN_TS < co_session.get_current_date_as_ts or
ht$BEGIN_TS is null)
and CREATE_TS <= co_session.get_current_date_as_ts)
union all
select /*+ index(htx HTX$EMP_I2) */ h.EMPNO, h.ENAME,
h.JOB, h.MGR, h.HIREDATE, h.SAL, h.COMM, h.DEPTNO,
h.UPDATE_TS, h.UPDATE_USER, h.CREATE_TS,
h.CREATE_USER
FROM EMP h left outer join HTX$EMP htx
ON h.rowid = chartorowid(ht$rid)
and co_session.get_current_date_as_ts between ht$BEGIN_TS
and ht$END_TS
where ht$rid is null
and CREATE_TS <= co_session.get_current_date_as_ts
```

Note the references to co_session.get_current_date_as_ts. This is how the value set in the procedure is used in the snapshot view. The snapshot view is always using the value of that function to determine the "When" of the results. The snapshot view has two distinct queries that are stitched together with a UNION ALL. Overall, the snapshot view will either pull from the base table (second query) or from historical data (first query). In the second query, the snapshot query will return rows from the base table unless either 1) the current_date is between the BEGIN_TS and END_TS of the HTX$ record (meaning there is a historical row available) or 2) the current_date is before the CREATE_TS of the record.

In the historical query (first query), rows are returned if the current_date is before the END_TS (but not before CREATE_TS) and after BEGIN_TS. The final result is a snapshot table that represents a consistent view of the base project data as it was at that time.

Figure 3:
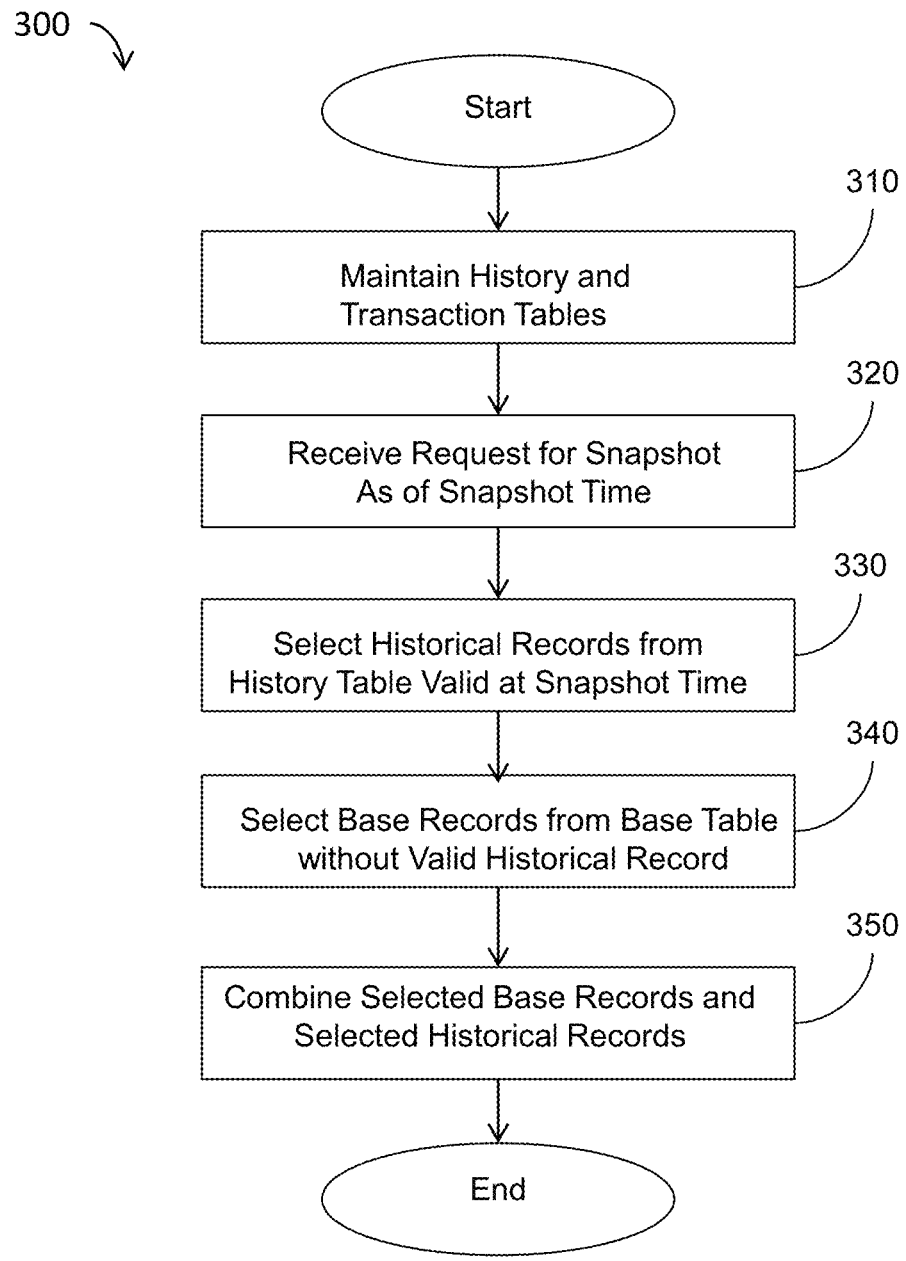
FIG. 3 illustrates one embodiment of a method associated with historical data tracking.

FIG. 3 illustrates one embodiment of a method 300 that is performed by the history logic 220 and/or the snapshot logic 230 of FIG. 2. The method 300 includes, at 310 maintaining a history table and a transaction table. The history table stores, for each record in project data that has ever been modified, at least one historical record that includes i) a version of the record prior modification and ii) a valid time range that defines a time during which the version of the record was valid. The transaction table stores, for each record in the project data that has ever been modified, a transaction record that includes historical time range that defines a time during which a historical record for the record is valid.

At 320 a request for a version of the project data as it existed at a snapshot time is received. The request may be received from a user entering a desired snapshot date and invoking a snapshot function (e.g., by specifying the snapshot view as source data). At 330, in response to the request, historical records are selected from the history table that have a valid time range that includes the snapshot time. At 340, base records are selected that do not have a transaction record in the transaction table with a history valid time that includes the snapshot time. At 350, the selected historical records and the selected base records are combined to create the snapshot result. In one embodiment, steps 330-350 are performed by using a snapshot view (e.g., snapshot view 230a of FIG. 2).

Named Snapshots

In some situations it may be advantageous to allow a user to conveniently produce commonly used snapshots without having to enter the effective date of the snapshot (hereinafter the "snapshot date"). For example, if a user often refers to the project data as of the end of each quarter, the user might want to store a named reference to snapshots taken at the end of each quarter. If an important event occurs on a certain date, it may be helpful to store a named reference that will produce a snapshot result at the time just prior to or immediately after the event. The name of the reference can refer to the event so that the user can produce the snapshot without having to remember the exact date of the event.

Figure 4:
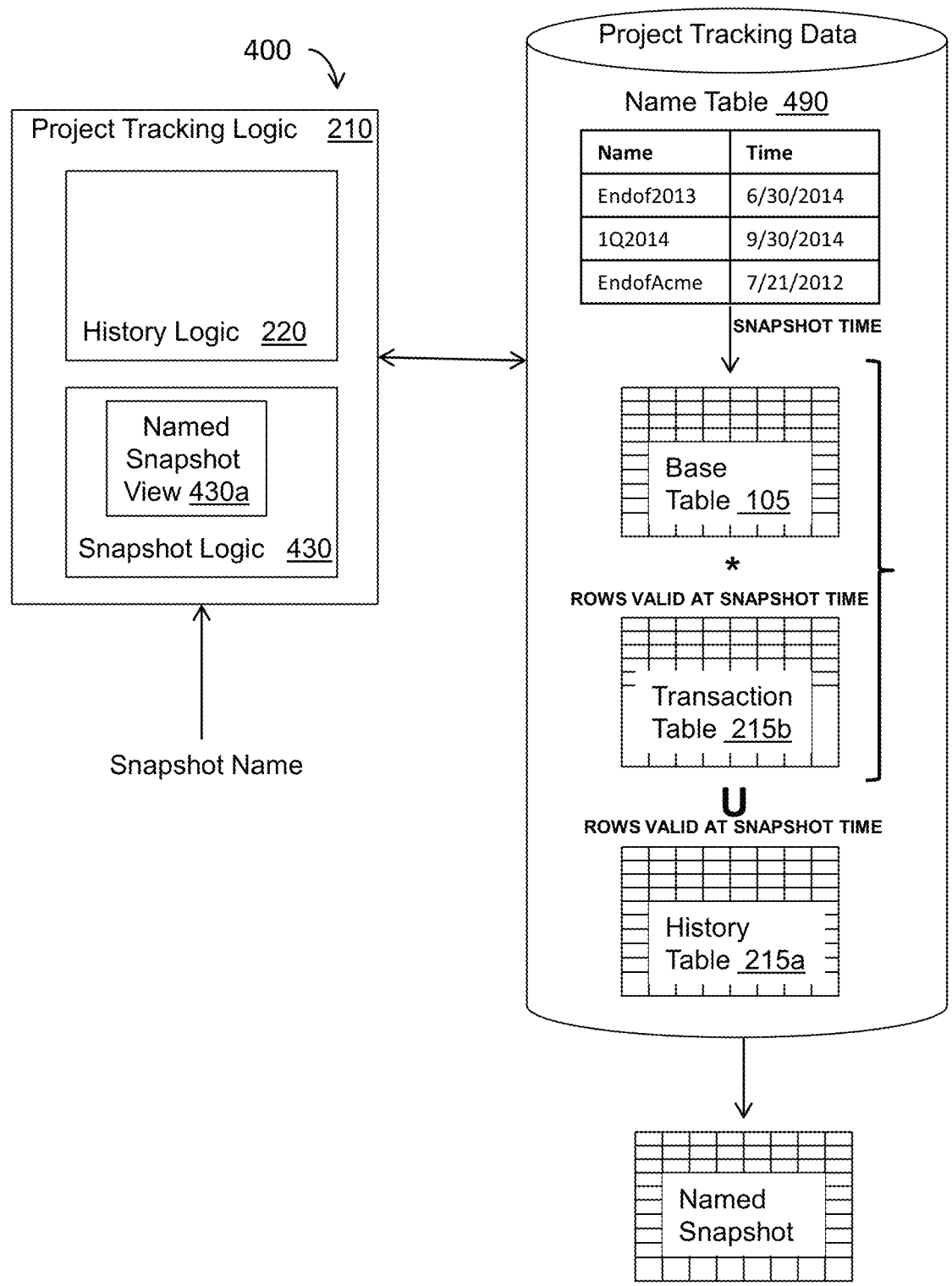
FIG. 4 illustrates one embodiment of a system associated with analyzing project history using named snapshots.

Referring now to FIG. 4, one embodiment of a system 400 is illustrated that allows a user to create a named reference to a snapshot of project data taken at a particular point in time. For the purposes of this description, a "snapshot" of project data is a set of rows selected from the base and historical tables that represent the project data at an effective or "snapshot" time. To support named snapshots, a name table 490 is provided that stores snapshot names mapped to snapshot times. When a user wishes to add a named snapshot to the system 400, she simply stores a snapshot name and snapshot time in the name table 490. While the name table 490 shows only two columns, an additional column may be used to store a unique identifier for each named snapshot and another column may store a long description of the snapshot for reference by the users.

The name table 490 shown in FIG. 4 includes a reference to a snapshot called "Endof2013" that has a snapshot time of Jun. 30, 2014 and a reference to a snapshot called "1Q2014" that has a snapshot time of Sep. 30, 2014. These two named snapshots align with a fiscal year that runs July 1 to June 30. The name table 490 includes a reference to a snapshot called "EndofAcme" that has a snapshot time of Jul. 21, 2012. This named snapshot captures project data just prior to the firing of a general contractor "Acme" that occurred on Jul. 21, 2012.

The system 400 includes snapshot logic 430 that accesses a named snapshot view 430a that is similar to snapshot view 230a of FIG. 2. The named snapshot view 430a is configured to access the name table to retrieve a snapshot time mapped to a received snapshot name. The named snapshot view 430a then creates a snapshot view at the snapshot time. The following table is configured to store the result of one embodiment of a named snapshot view that acts on an employee base table and history tables, where SYS_SNAPSHOT refers to the name table 490.

| Name | Null? | Type |
|---|---|---|
| SYS_SNAPSHOT_ID | | NUMBER(18) |
| SNAPSHOT_SHORT_NAME | | VARCHAR2(60 CHAR) |
| SNAPSHOT_TIME | | TIMESTAMP(6) |
| EMPNO | | NUMBER(4) |
| ENAME | | VARCHAR2(40) |
| JOB | | VARCHAR2(36) |
| MGR | | NUMBER(4) |
| HIREDATE | | DATE |
| SAL | | NUMBER(7, 2) |
| COMM | | NUMBER(7, 2) |
| DEPTNO | | NUMBER(2) |
| UPDATE_TS | | TIMESTAMP(6) |
| UPDATE_USER | | VARCHAR2(1020) |
| CREATE_TS | | TIMESTAMP(6) |
| CREATE_USER | | VARCHAR2(1020) |
| ROW_TYPE | | CHAR(4) |

The following illustrates one embodiment of a named snapshot view called "v_emp_sa" that accesses the sys_snapshot name table. Note the similarities between this named snapshot view and the example snapshot view provided above with reference to FIG. 2.

```
select ss.sys_snapshot_id, ss.snapshot_short_name,
ss.snapshot_time,
h.EMPNO, h.ENAME, h.JOB, h.MGR, h.HIREDATE, h.SAL,
h.COMM, h.DEPTNO, h.UPDATE_TS,
h.UPDATE_USER,h.CREATE_TS, h.CREATE_USER
, 'HIST' ROW_TYPE
from HT$EMP h
inner join sys_snapshot ss
on (ht$END_TS >= ss.snapshot_time
and ( ht$BEGIN_TS < ss.snapshot_time
union all
select /*+ index(htx HTX$EMP_I2) */
ss.sys_snapshot_id, ss.snapshot_short_name,
ss.snapshot_time,
b.EMPNO, b.ENAME, b.JOB, h.MGR, h.HIREDATE, b.SAL,
b.COMM, b.DEPTNO, b.UPDATE_TS, b.UPDATE_USER,
b.CREATE_TS, b.CREATE_USER
, 'BASE' ROW_TYPE
FROM EMP b cross join sys_snapshot ss
left outer join HTX$EMP htx
ON b.EMPNO = htx.EMPNO
and ss.snapshot_time between ht$BEGIN_TS and ht$END_TS
where htx.EMPNO is null
and b.CREATE_TS <= ss.snapshot_time
```

Each component of the named snapshot view performs a join operation between the base table or history tracking table and the name table 490 to insert the snapshot time associated with the snapshot name as the effective time of the snapshot view.

The following named snapshot query references a snapshot named "SNAP1" having an effective date of Jul. 23, 2014.

```
select row_type
, to_char(create_ts,'mm.dd.yyyy hh24:mi:ss') create_ts
, to_char(update_ts,'mm.dd.yyyy hh24:mi:ss') update_ts
, empno, ename, sal, job
from v_emp_sa
where snapshot_short_name = 'SNAP1'
```

When this query is performed the following snapshot view is returned:

| ROW_TYPE | CREATE_TS | UPDATE_TS | EMPNO | ENAME | SAL | JOB |
|---|---|---|---|---|---|---|
| HIST | Dec. 17, 1980 | Dec. 17, 1980 | 7369 | SMITH | 800 | CLERK |
| HIST | Feb. 22, 1981 | Feb. 22, 1981 | 7521 | WARD | 1250 | SALESMAN |
| HIST | Jan. 4, 2014 | Jul. 22, 2014 | 9010 | BECKY | 875 | MANAGER |
| BASE | Feb. 20, 1981 | Feb. 20, 1981 | 7499 | ALLEN | 1600 | SALESMAN |
| BASE | Apr .2, 1981 | Apr. 2, 1981 | 7566 | JONES | 2975 | MANAGER |
| BASE | Sep. 28, 1981 | Sep. 28, 1981 | 7654 | MARTIN | 1250 | SALESMAN |
| BASE | May 1, 1981 | May 1, 1981 | 7698 | BLAKE | 2850 | MANAGER |
| BASE | Jun. 9, 1981 | Jun. 9, 1981 | 7782 | CLARK | 2450 | MANAGER |
| BASE | Dec. 9, 1982 | Dec. 9, 1982 | 7788 | SCOTT | 3000 | ANALYST |
| BASE | Nov. 17, 1981 | Nov. 17, 1981 | 7839 | KING | 5000 | PRESIDENT |

It can be seen that none of the data in the snapshot view has been updated after Jul. 23, 2014, which is the effective date of SNAP1.

Data Trend Analysis Using Snapshot Views

Trend analysis is an important feature of project data tracking. Often, a user will want to see how certain data changes as a function of some regular time basis, like daily or monthly. Traditional systems would store a copy of all project data at each desired time increment, which consumes lots of memory and limits the granularity of trend analysis to the granularity of the stored copies of project data. Systems and methods described herein extend the concept of the snapshot view described in FIGS. 1-3 to provide trend analysis at any granularity on-the-fly so that copies of project data do not need to be stored, and memory requirements are reduced.

Figure 5:
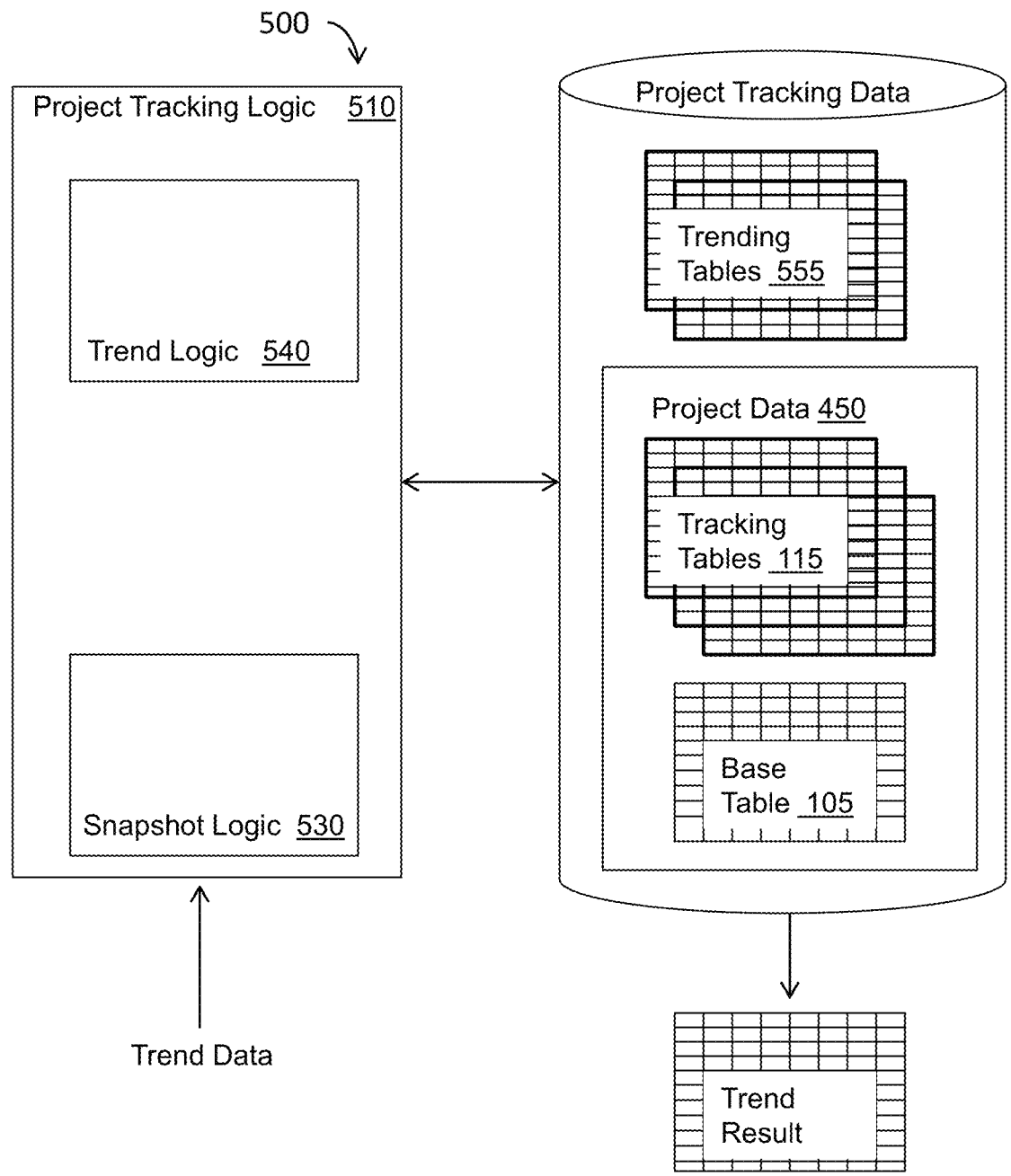
FIG. 5 illustrates one embodiment of a system associated with data trend analysis for project data.

FIG. 5 illustrates one example embodiment of a system 500 that outputs a trend result in response to a request for trend analysis. In one embodiment, the request includes trend data that specifies a trend range and a time basis (e.g., daily, weekly, and so on). The trend result captures project data status at regular intervals within the trend range. The time basis in the request dictates at which particular time increments the project data is captured.

The system 500 includes trend logic 540 that cooperates with snapshot logic 530 to generate a set of snapshots of project data, taken at regular intervals, that together represent a requested trend. To produce the trend result, the trend logic 540 provides a set of effective times, one for each time increment in the trend range, to the snapshot logic 530. The snapshot logic 530 is an adaptation of the snapshot logic 130 of FIG. 1 that generates a snapshot for each of the effective times instead of a single snapshot time. The trend logic 540 accesses one or more trending tables 555 to determine the set of effective times for which snapshots should be generated by the snapshot logic 530.

Figure 6:
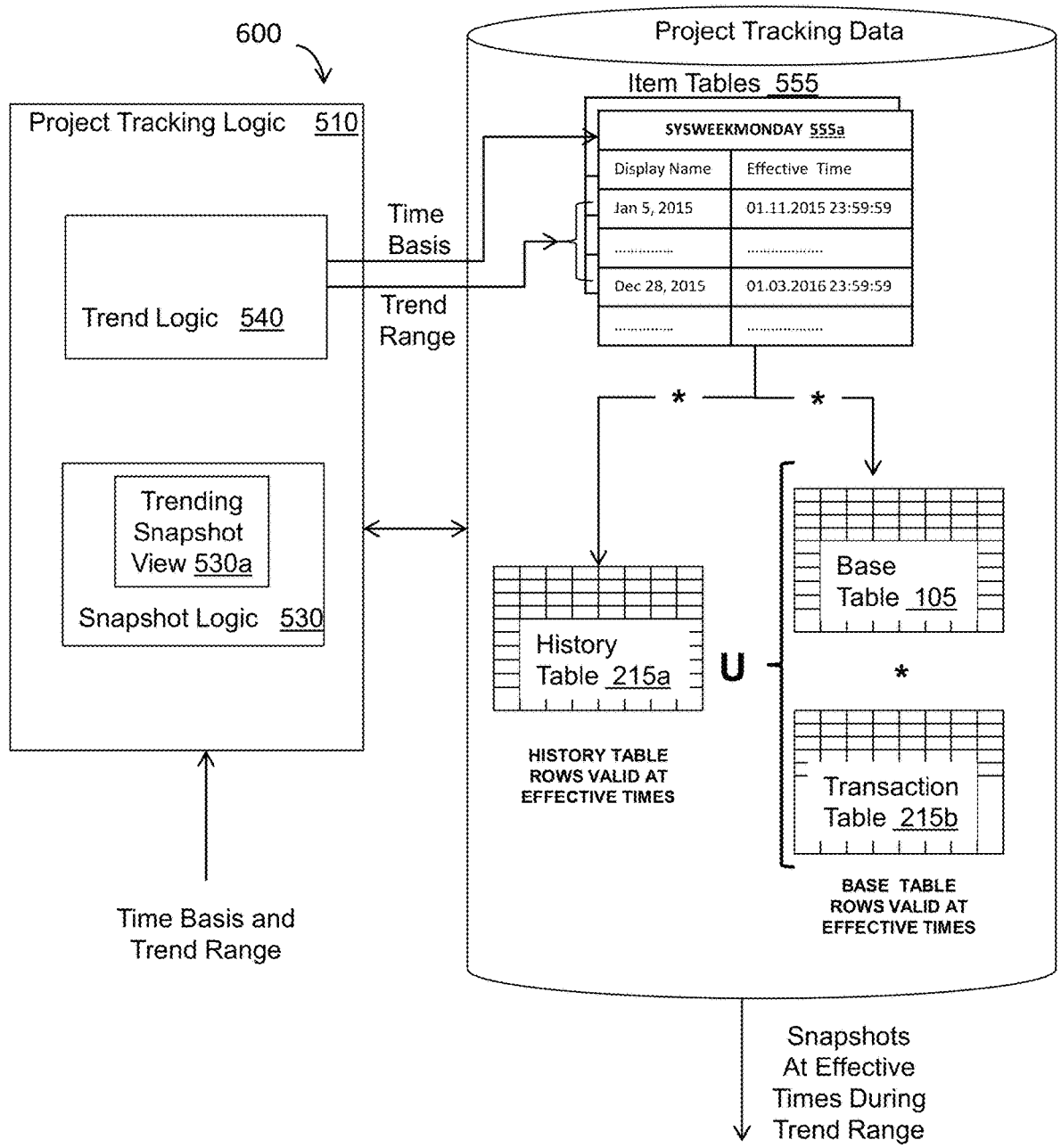
FIG. 6 illustrates one embodiment of a system associated with data trend analysis for project data.

Referring now to FIG. 6, one example embodiment of a system 600 that performs trending analysis on project data is illustrated. To support trend analysis, at least one item table 555 is stored for access by the trend logic 540. Each item table stores a single record for each time increment in a given time basis. The item table 555a shown in FIG. 6 is called "SYSWEEKMON" and has a record for each week, starting on Mondays, that has occurred or will ever occur (beginning and ending at some arbitrary system dates). An item table is stored for each time basis for which trending analysis is enabled. Thus, there may be an item table for daily, weekly, monthly, quarterly, and so on.

Each record in an item table includes a display date and an effective time. The display date is a name recognized by a user as identifying a particular time increment. For example, in the item table 555a for weeks starting with Monday, the display date column stores the dates of all Mondays in the years supported by the system 600. The item table stores an effective time for each display date. Recall that the effective time is the time that will be used by the snapshot logic 530 to generate the snapshots in the trend result. Note that the effective time for January 5 is January 11 at 11:59 PM. This is because when the user requests project status data for the week of January 5 what they are expecting to see is the project status at the end of that week which occurs on Sunday, January 11 at 11:59 PM.

Each record in the item table stores a display date that describes a particular time increment and an effective time that corresponds to a time at which project data should be captured for the particular time increment identified by the display date. In one embodiment, the effective time corresponds to the end of the record's time increment. However, depending on user preferences, any convention could be used to assign effective times to display dates.

Many different item tables may be stored to support many different respective time bases. In one embodiment, the item table records for all different time bases may be stored in one physical table. That is, the term "table" may be taken in a logical sense, meaning the logical grouping of item period records for a given time basis within a single item table is an effective item table for that time basis. A certain company may conceptualize weeks as starting on Sundays, while another company starts weeks on Saturdays. A different item table can be stored for each of these different concepts of week. The display date can correspond to any name a user gives to a particular time increment (e.g., 2015 Week 1, 1$^{st}$ Quarter Week 1, Jan. 5, 2015, First Monday 2015, and so on). All of these factors make the item table an extremely flexible way to capture trending intervals that make sense to a wide variety of potential users.

Further, the system 600 can be made extensible by allowing new item tables to be added to support new trend intervals. In one embodiment, a period table (not shown) records each time basis for which an item table is stored. The period table stores a name for the time basis (e.g., Weekly Monday Start) that is recognizable to a user and the name of the item table (e.g., SYSWEEKMON) that should be used when the time basis is requested. The period table may also record the granularity of each item table (e.g., weekly).

To perform trending analysis, the system 600 is configured to receive a request that includes a time basis and a trend range. For example, a request might include a time basis of "weekly starting on Monday" and a trend range of Jan. 1, 2015 to Mar. 31, 2015. The trend logic 540 selects the item table for the requested time basis (i.e., item table SYSWEEKMON 555a) and then selects a set of records from the item table that fall within the trend range (e.g., rows for January 5-Mar. 30, 2015). Note that in the illustrated embodiment, the trend logic 540 selects rows or records having a display date that falls within the trend range. In other embodiments the trend logic 540 selects rows or records having an effective time that falls within the trend range.

The trend logic 540 provides the effective times from the selected records to the snapshot logic 530, which uses a trending snapshot view 530a to generate a snapshot for each effective time. The following is an adaptation of the snapshot view 230 of FIG. 2 that will generate a set of snapshot view rows, one for each effective time in the selected set of item table rows. The view will have the following columns:

| Name | Null? | Type |
|---|---|---|
| PERIOD_CODE | | VARCHAR(20 CHAR) |
| TREND_DATE | | DATE |
| EMPNO | | NUMBER(4) |
| ENAME | | VARCHAR2(40) |
| JOB | | VARCHAR2(36) |
| MGR | | NUMBER(4) |
| HIREDATE | | DATE |
| SAL | | NUMBER(7, 2) |
| COMM | | NUMBER(7, 2) |
| DEPTNO | | NUMBER(2) |
| UPDATE_TS | | TIMESTAMP(6) |
| UPDATE_USER | | VARCHAR2(1020) |
| CREATE_TS | | TIMESTAMP(6) |
| CREATE_USER | | VARCHAR2(1020) |
| ROW_TYPE | | CHAR(4) |

In the above trending snapshot view result, "period_code" is the name of the item table taken from time basis in the request, "trend_date" is the date range, and "row type" indicates whether the row comes from the base table or the history table. In the view below, co_period_item is the selected item table, and d.d_date is the effective time from each of the selected rows in the item table.

```
select
d.period_code, d.display_date trend_date,
h.EMPNO, h.ENAME, h.JOB, h.MGR, h.HIREDATE, h.SAL, h.COMM,
h.DEPTNO, h.UPDATE_TS, h.UPDATE_USER, h.CREATE_TS,
h.CREATE_USER, 'HIST' ROW_TYPE
from HT$EMP h, co_period_item d
wheren(h.ht$END_TS>=d.day_dateand(h.ht$BEGIN_TS<d.day_date)
union all
select /*+ index(htx HTX$EMP_I2) */
d.period_code, d.display_date trend_date, b.EMPNO, b.ENAME,
b.JOB, b.MGR, b.HIREDATE, b.SAL, b.COMM, b.DEPTNO,
b.UPDATE_TS, b.UPDATE_USER, b.CREATE_TS,
b.CREATE_USER, 'BASE' ROW_TYPE
FROM EMP b full join co_period_item d ON 1=1
left outer join HTX$EMP htx ON b.EMPNO = htx.EMPNO
and d.day_date between htx.ht$BEGIN_TS and htx.ht$END_TS
```

```
where htx.EMPNO is null
and b.CREATE_TS <= d.day_date
```

This snapshot view 530*a* is illustrated functionally in FIG. 6 as a union of i) a join between the rows selected from the item table and the history table and ii) a join between the rows selected from the item table and the base table joined with the transaction table. An example request for a trending analysis for the Mason's salary between Apr. 20, 2015 and Apr. 24, 2015 on a daily basis would result in the following query on the trending snapshot view 530*a* (called "v_emp_tr):

```
Select trend date, sal
From v_emp_tr
Where period code = 'DAY'
And trend date between '20-APR-15' and '24-APR-15'
And ename - 'MASON';
```

The query results in the following set of five snapshots shown as a trending table having five rows:

| TREND DATE | SAL |
|---|---|
| 20 APR. 2015 | 1500 |
| 21 APR. 2015 | 1500 |
| 22 APR. 2015 | 1650 |
| 23 APR. 2015 | 1650 |
| 24 APR. 2015 | 1650 |

Figure 7:
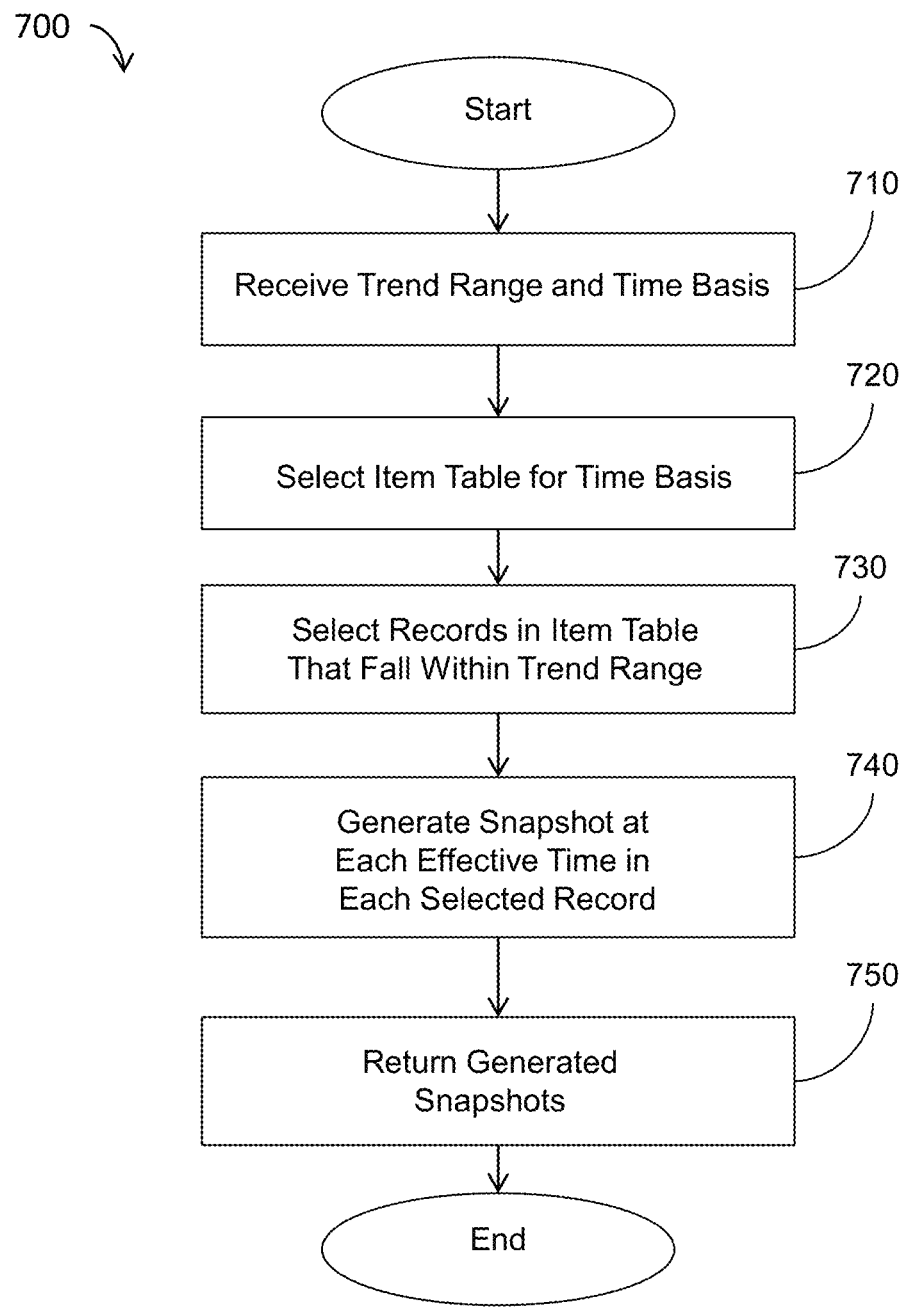
FIG. 7 illustrates one embodiment of a method associated with system associated with data trend analysis for project data.

FIG. 7 illustrates one example of a method 700 that returns a set of snapshots of project data taken at regular intervals in response to a request for trending analysis. In one embodiment, the method is performed by the project tracking logic 510 of FIGS. 5 and 6. The method 700 includes, at 710, receiving a request for trending analysis on project data, where the request includes a trend range and a time basis. The request may be received via a web browser, a cloud interface, population of a data structure with the trend range and time basis, or any other appropriate manner.

At 720, an item table associated with the time basis is selected. The item table includes a record for each time increment of the time basis, and each respective record includes an effective time for the respective time increment. The item table may be selected by accessing a period table that maps the requested time basis to a particular item table. At 730, a set of records is selected from the item table that fall within the trend range and at 740 a snapshot of the project data is generated for each effective time of each respective selected record in the item table. A trending snapshot view such as the view 530*a* described above may be used to generate the snapshots. At 750, the generated snapshots of project data are returned in response to the request for trending analysis.

In one embodiment, the effective time for a time increment comprises a time at which the time increment ends. In one embodiment, the method 700 includes storing a plurality of respective item tables for different respective time bases, and where each item table includes a record for each time increment in the time basis for the item table. In one embodiment, the method 700 includes storing a period table that records each time basis for which an item table is stored and accessing the period table to identify an item table associated with the time basis in the request. In one embodi-ment, each item table record stores a display date that is different from the effective date. Records having a display date within the trend range are selected from the item table for generating the snapshots.

In one embodiment, the method 700 includes generating the snapshots by maintaining a history table and a transaction table. The history table stores, for each record in the project data that has ever been modified, at least one corresponding historical record that includes i) a version of the record prior to modification and ii) a valid time range that defines a time during which the version of the record was valid. The transaction table stores, for each record in the project data that has ever been modified, a corresponding transaction record that includes a historical time range that defines a time during which a historical record for the record is valid. The method includes executing a trend view on the history table, the transaction table, and a base table that stores base records corresponding to a current version of the records in the project data. The trend view is configured to, for each effective time in the selected item table records: i) select historical records in the history table that have a valid time range that includes the effective time; ii) select base records from the base table that do not have a corresponding transaction record with a history valid time that includes the effective time; and iii) combine the selected historical records and the selected base records to create a snapshot for the effective time. In one embodiment, the trend view joins the selected records in the item table to the base table and transaction table.

It can be seen from the foregoing description that the concept of snapshots can be extended using item tables to support trend analysis for any time basis. An item table having a record that defines an effective time for each time increment in a given time basis is used to generate a set of snapshots that describe a trend. Additional item tables can be added at any time to extend the types of trending analysis that can be performed.

Computing Device Embodiment

Figure 8:
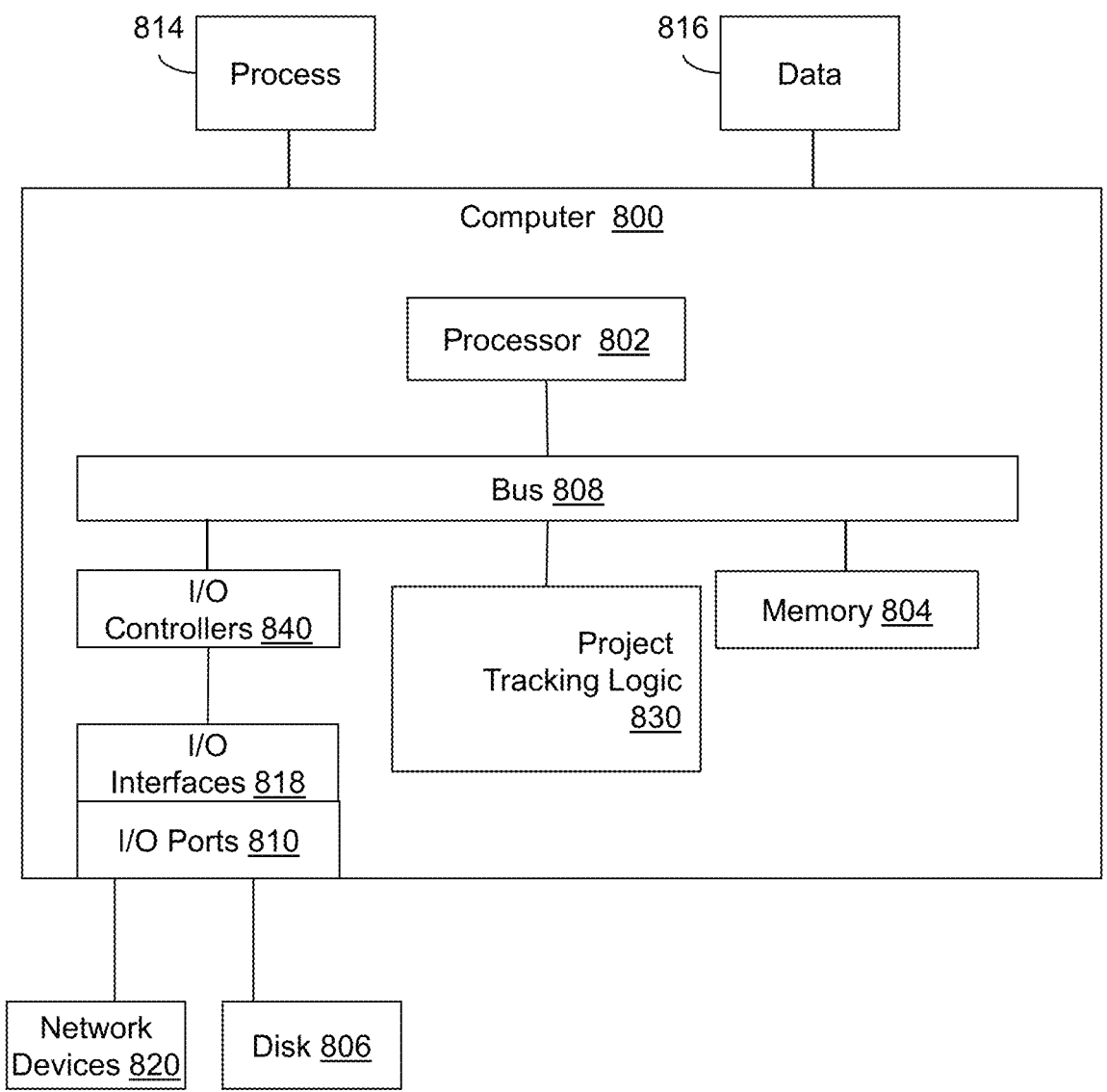
FIG. 8 illustrates an embodiment of a computing system configured with the example systems and/or methods disclosed.

FIG. 8 illustrates an example computing device that is configured and/or programmed with one or more of the example systems and methods described herein, and/or equivalents. The example computing device may be a computer 800 that includes a processor 802, a memory 804, and input/output ports 810 operably connected by a bus 808. In one example, the computer 800 may include project tracking logic 830 configured to facilitate project tracking using views and tracking tables in a manner similar to project tracking logic 110, 210, 410, and 510 shown in FIGS. 1, 2, 4, 5, and 6, respectively. In different examples, the logic 830 may be implemented in hardware, a non-transitory computer-readable medium with stored instructions, firmware, and/or combinations thereof. While the logic 830 is illustrated as a hardware component attached to the bus 808, it is to be appreciated that in other embodiments, the logic 830 could be implemented in the processor 802, stored in memory 804, or stored in disk 806.

In one embodiment, logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform trending analysis using views and trending tables. The means may also be implemented as stored computer executable instructions that are presented to computer 800 as data 816 that are temporarily stored in memory 804 and then executed by processor 802.

Logic 830 may also provide means (e.g., hardware, non-transitory computer-readable medium that stores executable instructions, firmware) for performing trending analysis using views and trending tables.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A storage disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to cause a processor or computer to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable storage medium storing computer-executable instructions that when executed by at least a processor of a computer cause the computer to:
   receive, by at least the processor, a request for trending analysis on project data, where the request includes a trend range and a time basis;
   in response to determining that an item table is associated with the time basis of the request, select, by at least the processor, the item table from amongst a plurality of item tables that are each associated with a corresponding time basis, where the item table includes a record for each time increment of the time basis, where each respective record includes an effective time for the respective time increment;
   select, by at least the processor, a set of records in the item table that fall within the trend range;
   generate, by at least the processor, a snapshot of the project data for each effective time in each respective selected record in the item table, wherein the generation includes:
      maintaining a history table that stores a version history for each record in the project data that has ever been modified, wherein the version history has at least one corresponding historical record that includes a valid time range during which a version of the record was valid,
      maintaining a transaction table that stores a transaction record for each record in the project data that has ever been modified, and
      executing a trend view on the history table, the transaction table, and a base table that stores base records corresponding to a current version of the records in the project data, to create a snapshot for each effective time in the selected item table records based at least in part on one or more of the historical records valid at the effective time; and
   in response to the request for trending analysis, return, by at least the processor, the generated snapshots of project data.

2. The non-transitory computer-readable storage medium of claim 1, where the effective time for a time increment comprises a time at which the time increment ends.

3. The non-transitory computer-readable storage medium of claim 1, where each item table includes a record for each time increment in the time basis for the item table.

4. The non-transitory computer-readable storage medium of claim 3, where the instructions cause the computer to:
   store a period table that records each time basis for which an item table is stored;

access the period table to identify an item table associated with the time basis in the request.

5. The non-transitory computer-readable storage medium of claim 1, wherein:
the at least one corresponding historical record in the version history for each record also includes a version of the record prior to modification;
the transaction record for each record in the project data that has ever been modified includes a historical time range that defines a time during which a historical record for the record is valid; and
the trend view is configured to, for each effective time in the selected item table records:
select historical records in the history table that have a valid time range that includes the effective time;
select base records from the base table that do not have a corresponding transaction record with a history valid time that includes the effective time; and
combine the selected historical records and the selected base records to create the snapshot for the effective time.

6. The non-transitory computer-readable storage medium of claim 5, where the trend view joins the selected records in the item table to the base table and transaction table.

7. The non-transitory computer-readable storage medium of claim 1, where each item table record stores a display date that is different from the effective date, and where the instructions cause the computer to select records in the item table having a display date within the trend range for generating the snapshots.

8. A computing system, comprising:
a processor;
a memory operably connected to the processor;
a non-transitory computer-readable storage medium operably connected to the processor and storing computer-executable instructions that when executed by at least the processor cause the computing system to:
receive, by at least the processor, a request for trending analysis on project data, where the request includes a trend range and a time basis;
in response to determining that an item table is associated with the time basis of the request, select, by at least the processor, the item table from amongst a plurality of item tables that are each associated with a corresponding time basis, where the item table includes a record for each time increment of the time basis, where each respective record includes an effective time for the respective time increment;
select, by at least the processor, a set of records in the item table that fall within the trend range;
generate, by at least the processor, a snapshot of the project data for each effective time in each respective selected record in the item table, wherein the generation includes:
maintaining a history table that stores a version history for each record in the project data that has ever been modified, wherein the version history has at least one corresponding historical record that includes a valid time range that defines a time during which the version of the record was valid,
maintaining a transaction table that stores a transaction record for each record in the project data that has ever been modified, and
executing a trend view on the history table, the transaction table, and a base table that stores base records corresponding to a current version of the records in the project data, to create a snapshot for each effective time in the selected item table records based at least in part on one or more of the historical records valid at the effective time; and
in response to the request for trending analysis, return, by at least the processor, the generated snapshots of project data.

9. The computing system of claim 8, wherein the effective time for a time increment comprises a time at which the time increment ends.

10. The computing system of claim 8, wherein the instructions cause the computing system to store a plurality of respective item tables in the computer-readable storage media for different respective time bases, and where each item table includes a record for each time increment in the time basis for the item table.

11. The computing system of claim 10, wherein the instructions cause the computing system to:
store, in the computer-readable storage media, a period table that records each time basis for which an item table is stored; and
access the period table to identify an item table associated with the time basis in the request.

12. The computing system of claim 8, where the history table and the transaction table are different tables.

13. The computing system of claim 8, where each item table record stores a display date that is different from the effective date, and where the processor is configured to select records in the item table having a display date within the trend range for generating the snapshots.

14. A computer-implemented method comprising, with a processor:
receiving a request for trending analysis on project data, where the request includes a trend range and a time basis;
in response to determining that an item table is associated with the time basis of the request, selecting the item table from amongst a plurality of item tables that are each associated with a corresponding time basis, where the item table includes a record for each time increment of the time basis, where each respective record includes an effective time for the respective time increment;
selecting a set of records in the item table that fall within the trend range;
generating a snapshot of the project data for each effective time in each respective selected record in the item table, wherein the generating includes:
maintaining a history table that stores a version history for each record in the project data that has ever been modified, wherein the version history has at least one corresponding historical record that includes a valid time range that defines a time during which the version of the record was valid,
maintaining a transaction table that stores a transaction record for each record in the project data that has ever been modified, and
executing a trend view on the history table, the transaction table, and a base table that stores base records corresponding to a current version of the records in the project data to create a snapshot for each effective time in the selected item table records based at least in part on the one or more historical records valid at the effective time; and
in response to the request for trending analysis, returning the generated snapshots of project data.

15. The computer-implemented method of claim 14, where the effective time for a time increment comprises a time at which the time increment ends.

16. The computer-implemented method of claim 14, where each item table includes a record for each time increment in the time basis for the item table.

17. The computer-implemented method of claim 16, further comprising, with the processor:
storing a period table that records each time basis for which an item table is stored;
accessing the period table to identify an item table associated with the time basis in the request.

18. The computer-implemented method of claim 14 wherein:
the at least one corresponding historical record in the version history also includes a version of the record prior to modification;
the trend view is configured to, for each effective time in the selected item table records:
select historical records in the history table that have a valid time range that includes the effective time;
select base records from the base table that do not have a corresponding transaction record with a history valid time that includes the effective time; and
combine the selected historical records and the selected base records to create the snapshot for the effective time.

19. The computer-implemented method of claim 18, where the trend view joins the selected records in the item table to the base table and transaction table.

20. The computer-implemented method of claim 14, where each item table record stores a display date that is different from the effective date, and where the method includes, with the processor, selecting records in the item table having a display date within the trend range for generating the snapshots.

* * * * *